United States Patent [19]

Ueta et al.

[11] Patent Number: 4,487,882
[45] Date of Patent: Dec. 11, 1984

[54] FLUOROELASTOMER COMPOSITION

[75] Inventors: Yutaka Ueta, Osaka; Shoji Kawachi, Hyogo; Kazutaka Hosokawa, Osaka, all of Japan

[73] Assignee: Daikin Kogyo Co., Ltd., Osaka, Japan

[21] Appl. No.: 536,532

[22] Filed: Sep. 28, 1983

[30] Foreign Application Priority Data

Sep. 28, 1982 [JP] Japan ................................. 57-170595

[51] Int. Cl.$^3$ ...................... C08L 27/16; C08L 53/00; C08L 27/18; C08L 27/20
[52] U.S. Cl. .................................... 524/505; 524/451; 525/88; 525/92; 525/93; 525/276
[58] Field of Search ........................... 525/88; 524/505

[56] References Cited

U.S. PATENT DOCUMENTS 4,158,678  6/1979  Tatemoto et al. .................. 525/276

Primary Examiner—Carman J. Seccuro
Attorney, Agent, or Firm—Birch, Stewart, Kolasch & Birch

[57] ABSTRACT

A fluoroelastomer composition comprising a fluoroelastomer and a thermoplastic fluoroelastomer, which has good roll retention and roll processability and a mixed compound of which has little self-adhesiveness.

19 Claims, No Drawings

FLUOROELASTOMER COMPOSITION

The present invention relates to a fluoroelastomer composition. More particularly, it relates to a fluoroelastomer composition of which processability, mechanical properties, chemical resistance, etc. are improved by formulation of a thermoplastic fluoroelastomer.

A fluoroelastomer has excellent heat resistance, abrasion resistance, chemical resistance, solvent resistance, oil resistance, etc. and can be shaped to form a tube, sheet, film and other forms (eg. O-ring, sealing materials, etc.) or applied on various substrates in many fields.

The fluoroelastomer has, however, some drawbacks such that its roll retention is so poor that its roll processability is not satisfactory, that its mixed compound tends to self-adhere or adhere to a surface of a mold and that a cross-linked fluoroelastomer also tends to self-adhere.

As a result of an extensive study, it has now been found that formulation of a thermoplastic fluoroelastomer improves not only the processability of the fluoroelastomer but also properties of the cross-linked fluoroelastomer such as mechanical properties and chemical resistance.

According to the present invention, there is provided a fluoroelastomer composition comprising a fluoroelastomer and a thermoplastic fluoroelastomer.

The term "thermoplastic fluoroelastomer" herein used is intended to mean a fluoroelastomer which shows elasticity like a cross-linked elastomer at a comparatively low temperature and shows plastic flow when heated.

Preferred thermoplastic fluoroelastomer comprises a polymeric chain comprising at least one elastomeric polymer segment and at least one non-elastomeric polymer segment, at least one of these segments being a fluorine-containing polymer segment. Preferably, the weight ratio of the elastomeric polymer segment and the non-elastomeric polymer segment is from 40:60 to 95:5.

More preferred thermoplastic fluoroelastomer comprises a polymeric chain comprising two or three polymer segments, at least one iodine atom liberated from an iodinated compound and bonded to a terminal carbon atom of the polymeric chain and a fragment of the iodinated compound excluding said liberated iodine atom therefrom;

one polymer segment (when the polymeric chain comprises two polymer segments) or one or two polymer segments (when the polymeric chain comprises three polymer segments) being elastomeric polymer segment(s) having a molecular weight of from 30,000 to 1,200,000 selected from the group consisting of (1) a vinylidene fluoride/hexafluoropropylene or pentafluoropropylene/tetrafluoroethylene polymer in a molar ratio of 45–90:5–50:0–35 and (2) a perfluoro($C_1$-$C_3$-alkyl vinyl ether) (including those having plural ether linkages)/tetrafluoroethylene/vinylidene fluoride polymer in a molar ratio of 15–75:0–85:0–85, other polymer segment(s) being a non-elastomeric polymer having a molecular weight of from 3,000 to 400,000 selected form the group consisting of (3) a vinylidene fluoride/tetrafluoroethylene polymer in a molar ratio of 0:100 to 100:0 and (4) a ethylene/tetrafluoroethylene/hexafluoropropylene, 3,3,3-trifluoropropylene-1, 2-trifluoromethyl-3,3,3-trifluoropropylene-1 or perfluoro($C_1$-$C_3$-alkyl vinyl ether) (including those having plural ether linkages) polymer in a molar ratio of 40–60:60–40:0–30, and the weight ratio of the elastomeric polymer segment and the non-elastomeric polymer segment being from 40:60 to 95:5.

The above described preferred thermoplastic iodine-containing fluoroelastomer is disclosed in Japanese Patent Publication No. 4728/1983 and U.S. Pat. No. 4,158,678, the disclosure of which is hereby incorporated by reference. An example of such an iodine containing fluoroelastomer is a segmented polymer comprising a sequence of two or more polymer segments, an iodine atom liberated from an iodinated compound bonded at a terminal position of said sequence and a fragment of the iodinated compound from which at least one iodine atom has been removed bonded at another terminal position of said sequence, whereby said sequence intervenes between said iodine atom and said fragment, wherein adjacent polymer segments are different in steric configuration or monomeric composition, at least the first polymer segment of said polymer segments containing fluorine and each polymer segment having a molecular weight of not less than 10,000 but at least one polymer segment having a molecular weight of not less than 30,000, the iodinated compound being a perhalohydrocarbon of 1 to 16 carbon atoms wherein at least one of the halogen atoms is an iodine atom but only one iodine atom is present on every two adjacent carbon atoms and the other halogen atoms consist of (1) fluorine atoms or (2) fluorine atoms and chlorine atoms but the number of chlorine atoms is not more than that of fluorine atoms and only one chlorine atom is present on one carbon atom, and which may have an oxygen linkage (—O—) between any two carbon atoms and/or include additionally —$CF_2H$ or =$CF_2$, and each of the polymer segments being constituted with the units of the monomer(s) selected from the following Groups (A) and (B), the said Group (A) consisting of fluorine-containing unsaturated polymerizable monomers of the formula $CF_2$=CXY wherein X is a hydrogen atom or a fluorine atom, and in the case of X being a hydrogen atom Y is a hydrogen atom, and in the case of X being a fluorine atom Y is a hydrogen atom, a chlorine atom, a fluorine atom, a trifluoromethyl group, a difluoromethyl group, a perfluoroalkoxy group of 1 to 3 carbon atoms, a group of the formula —$(CF_2)_m$COOM in which m is an integer of 0 to 3 and M is hydrogen, sodium or potassium, or a group of the formula —$(OCF_2)_p$—$(OCF_2CF_2)_q$— $(OCF_2CF(CF_3))_r$—Z in which Z is —COF, —COOM, —$SO_2F$ or —$SO_3M$, M being as defined above, and p, q and r are each an integer of 0 to 3 but at least one of them is not zero, and the said Group (B) consisting of unsaturated polymerizable monomers of 2 to 8 carbon atoms containing no fluorine atoms.

The iodine-containing thermoplastic fluoroelastomer comprises the polymeric chain comprises at least two polymer segments, at least one iodine atom which is liberated from the iodinated compound and bonded to one terminal carbon atom of the polymeric chain and the fragment of the iodinated compound excluding the liberated iodine atom therefrom. The thermoplastic iodine-containing fluoroelastomer may be represented by the formula:

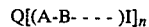

wherein Q is the fragment of the iodinated compound excluding the liberated iodine atom therefrom, A, B, etc. are each a polymer segment provided that at least one of them is a fluorine-containing polymer segment, I is an iodine atom liberated from the iodinated compound, and n is the valency of the fragment Q. In said thermoplastic fluoroelastomer, the two polymer segments adjacent each other consist of different monomers or of same monomers in different proportions. Preferably, each polymer segment has a molecular weight of at least 3,000 and at least one segment has a molecular weight of at least 30,000, so that telomeric molecular weight range is excluded. Further, when the iodinated compound has a polymerizable double bond in the molecule, the fragment of the iodinated compound excluding the liberated iodine atom therefrom may have such a substituent as is derived from the monomer constituting the polymer segment or the iodinated compound itself. The thermoplastic iodine-containing fluoroelastomer may contain 0.001 to 10% by weight of iodine atom. The iodine atom bonded to the thermoplastic fluoroelastomer can be eliminated by an appropriate treatment or substituted by another atom or a substituent. Such an iodine atom-eliminated or substituted fluoroelastomer is also used in the present invention.

The iodinated compound is a perhalohydrocarbon of 1 to 16 carbon atoms, preferably of 1 to 8 carbon atoms, wherein at least one of the halogen atoms is an iodine atom but only one iodine atom is present on every two adjacent carbon atoms and the other halogen atoms consist of fluorine atoms or fluorine atoms and chloride atoms but the number of chlorine atoms is not more than that of the fluorine atoms and only one chlorine atom is present on one carbon atom, and which may have an oxygen linkage (—O—) between any two carbon atoms and/or include additionally —CF$_2$H or =CF$_2$. The perhalohydrocarbon may be a straight, branched or cyclic one. The perhalohydrocarbon itself is usually saturated, but when a group of =CF$_2$ is present, it is unsaturated as the whole. The number of the iodine atoms in the perhalohydrocarbon is preferred to be 1 or 2, although no particular upper limitation is present. Such an unsaturated perhalohydrocarbon is per se polymerizable and participates in the radical polymerization. Thus, the unsaturated iodinated compound serves not only as the initiating agent of the radical polymerization but also as the monomer for formation of the polymer segment. Accordingly, its use may afford a segmented polymer having a somewhat complex structure.

The fluoroelastomer to be used in the present invention may be any one of conventional fluoroelastomers. The specific examples of the fluoroelastomer are vinylidene fluoride/hexafluoropropylene copolymers, vinylidene fluoride/tetrafluoroethylene/hexafluoropropylene terpolymers, vinylidene fluoride/chlorotrifluoroethylene copolymers, tetrafluoroethylene/propylene copolymers, hexafluoropropylene/ethylene copolymers, perfluoroalkyl vinyl ether (including those having plural ether linkages)/olefin (e.g. tetrafluoroethylene, ethylene, etc.) copolymers, fluorosilicone elastomers, fluorophosphazene elastomers, etc. Some of these fluoroelastomers may bear linked iodine or bromine atoms, which improve cross-linkability of the fluoroelastomers (cf. Japanese Patent Publication (unexamined) Nos. 125491/1978 and 130781/1982 and Japanese Patent Publication No. 4115/1978).

The content of the thermoplastic fluoroelastomer is usually from 20 to 95% by weight, preferably from 30 to 90% by weight based the weight of the composition. When it is higher lower than 20% by weight, the object of the invention is not achieved. When it is higher than 95% by weight, the flowability of the composition is deteriorated.

The composition of the invention may be prepared by a conventional method, for example by co-coagulating both fluoroelastomers from an aqueous dispersion containing them, or kneading both fluoroelastomers by means of mixing rolls, kneader or a Banbury mixer by a conventional manner.

The composition of the invention may be cross-linked in the same manner as in the case of the conventional composition of the fluoroelastomer. As the cross-linking agent to be optionally added in the composition of the invention, any one that is known as a cross-linking agent for the conventional fluoroelastomer may be used. Specific examples of the cross-linking agent are organic peroxide compounds, polyhydroxy compounds/cross-linking accelerators and polyamine compounds. The composition containing the cross-linking agent can be cross-linked by a per se conventional method. The cross-linking of the composition may be also effected by light or heat. In such a case, a light or heat sensitive compound is preferably added in the composition. Further, the cross-linking of the composition may be effected by radiation.

When the cross-linking of the composition is effected by the use of the organic peroxide compound or by radiation, a polyfunctional compound is preferably added in the composition. Examples of the polyfuctional compound are those bearing as the functional group at least one of CH$_2$=CH—, CH$_2$=CH—CH$_2$— and CF$_2$=CF—.

In the composition of the invention, any additives such as carbon black, silica and talc that are added in the conventional fluoroelastomer may be added.

The composition of the invention may be formed in a conventional formed article such as a tube, sheet, film and O-ring in a conventional manner.

The present invention will be hereinafter explained further in detail by the following Examples, in which % and part are by weight unless otherwise indicated.

EXAMPLES 1 TO 4 AND COMPARATIVE EXAMPLE 100 parts of a mixture of a thermoplastic fluoroelastomer comprising 88% of vinylidene fluoride/hexafluoropropylene/tetrafluoroethylene polymer segments (molar ratio, 50/30/20) and 12% of polyvinylidene fluoride polymer segments and a fluoroelastomer comprising a vinylidene fluoride/hexafluoropropylene/tetrafluoroethylene terpolymer (molar ratio, 50/30/20), the formulation of which mixture is shown in the Table; 30 parts of medium thermal carbon; 1.5 parts of Perhexa-2,5B (2,5-dimethyl-2,5-di(t-butylperoxy)hexane) and 40 parts of triallyl isocyanurate were successively added and kneaded on kneading rolls. The roll processability of the composition was observed and evaluated as follows:
1. Roll retention is difficult.
2. Roll retention is poor.
3. Edges of the mixed compound are torn.
4. Roll retention is good.
5. Roll retention is excellent.

Five sheets of the mixed compound of 3 mm thick (300 mm×200 mm) were piled and kept standing for one day. The sheets were peeled off and the self-adhesiveness was evaluated as follows:
1. Self-adhered to form a conglomerate.
2. Self-adhered and difficult to peel off.
3. Self-adhered but peeled off with appropriate force.
4. Self-adhered but easily peeled off.
5. Not self-adhered.

The mixed compound was rolled and charged in a mold for O-ring (P-24, 30 O-rings) and press cured at 300° C. under 200 Kg/cm$^2$G for 10 minutes. The molded O-rings were released from the mold. The mold release characteristics is evaluated as follows:
1. Stuck to the mold and not released.
2. Partly stuck to the mold and difficult to release.
3. Partly stuck to the mold but released.
4. Released.
5. Easily released.

The rolled mixed compound was charged in a mold and press cured at 160° C. under 50 Kg/cm$^2$G for 10 minutes and then oven cured at 180° C. for 4 hours to obtain a sheet of 2 mm thick. From the thus obtained sheet, sample pieces of each 25 mm wide and 100 mm long were cut out. Two pieces were piled, and compressive strain of about 10% was applied on the piled sheets. The adhesiveness of the sheets was evaluated as follows:
1. Severely adhered and the elastomer is broken when the sheets are peeled off.
2. Very difficult to peel off.
3. Difficult to peel off.
4. Easily peeled off.
5. Not adhered.

Form the sheet of 2 mm thick, No. 4 dumbbell was cut out according to JIS (Japanese Industrial Standards) K 6301 and its tensile strength, elongation and tear strength were measured.

A piece (10 mm×20 mm) was cut out from the sheet of 2 mm thick and immersed in 70% nitric acid at 100° C. for 70 hours, and the volume change was measured.

All the results are shown in Table.

The same tests as described above were repeated with the fluoroelastomer alone (Comparative Example). The results are also shown in Table.

TABLE

| | Example | | | | Comparative |
|---|---|---|---|---|---|
| | 1 | 2 | 3 | 4 | Example |
| Thermoplastic fluoroelastomer (parts) | 95 | 70 | 50 | 20 | 0 |
| Fluoroelastomer (parts) | 5 | 30 | 50 | 80 | 100 |
| Roll processability | 4 | 3–4 | 3 | 2–3 | 2 |
| Self-adhesiveness | 5 | 4 | 2–3 | 1–2 | 1 |
| Mold release characteristics | 4 | 3 | 2 | 2 | 2 |
| Adhesiveness | 4 | 3 | 2 | 2 | 2 |
| Tensile strength (Kgf/cm$^2$) | — | 220 | 215 | 208 | 198 |
| Elongation (%) | — | 370 | 350 | 350 | 350 |
| Tear strength (Kgf/cm$^2$) | — | 20.7 | 20.3 | 19.2 | 19.0 |
| Chemical resistance (volume change, %) | 3.4 | 4.6 | 5.9 | 6.5 | 7.2 |

What is claimed is:

1. A fluoroelastomer composition, comprising:
a fluoroelastomer selected from the group consisting of vinylidene fluoride/hexafluoropropylene copolymers, vinylidene fluoride/tetrafluoroethylene/hexafluoropropylene terpolymers, vinylidene fluoride/chlorotrifluoroethylene copolymers, tetrafluoroethylene/propylene copolymers, hexafluoropropylene/ethylene copolymers, perfluoroalkyl vinyl ether/olefin copolymers, fluorosilicone elastomers and fluorophosphazene elastomers; and a thermoplastic fluoroelastomer comprising a polymeric chain having two or three polymer segments, at least one iodine atom liberated from an iodinated compound bonded to a terminal position of the polymeric chain and a fragment of the iodinated compound from which at least one iodine atom has been removed therefrom bonded at another terminal position of said polymeric chain, said iodinated compound being a perhalohydrocarbon of 1 to 16 carbon atoms wherein at least one of the halogen atoms is an iodine atom but no more than one iodine atom is present on every two adjacent carbon atoms; one polymer segment (when the polymeric chain comprises two polymer segments) or one or two polymer segments (when the polymeric chain comprises three polymer segments) being an elastomeric polymer segment(s) having a molecular weight of from 30,000 to 1,200,000 selected from the group consisting of (1) a vinylidene fluoride/hexafluoropropylene or pentafluoropropylene/tetrafluoroethylene polymer in a molar ratio of 45–90:5–50:0–35 and (2) a perfluoro(C$_1$-C$_3$-alkyl vinyl ether) (including those having plural ether linkages)/tetrafluoroethylene/vinylidene fluoride polymer in a molar ratio of 15–75:0–85:0–85, the other polymer segment(s) being a non-elastomeric polymer segment having a molecular weight of from 3,000 to 400,000 selected from the group consisting of (3) a vinylidene fluoride/tetrafluoroethylene polymer in a molar ratio of 0:100 to 100:0 and (4) a ethylene/tetrafluoroethylene/hexafluoropropylene, 3,3,3-trifluoropropylene-1, 2-trifluoromethyl-3,3,3-trifluoropropylene-1 or perfluoro(C$_1$-C$_3$-alkyl vinyl ether) (including those having plural ether linkages) polymer in a molar ratio of 40–60:60:40:0–30, wherein the weight ratio of the elastomeric polymer segment to the nonelastomeric polymer segment is from 40:60 to 95:5.

2. The composition of claim 1, wherein the weight ratio of the elastomeric polymer segment and the nonelastomeric polymer segment is from 40:60 to 95:5.

3. The composition of claim 1, which contains 20 to 95% by weight of the thermoplastic fluoroelastomer.

4. The composition of claim 1, which contains 30 to 90% by weight of the thermoplastic fluoroelastomer.

5. The composition of claim 1, which further comprises a cross-linking agent.

6. A formed article of the fluoroelastomer composition of claim 1.

7. The formed article of claim 6, which is a film or sheet.

8. The formed article of claim 6, which is an O-ring.

9. A process for preparing the fluoroelastomer composition of claim 1, comprising co-coagulating the fluoroelastomers from an aqueous dispersion.

10. A process for preparing the fluoroelastomer of claim 13, comprising kneading the fluoroelastomer and the thermoplastic fluoroelastomer.

11. A fluoroelastomer composition, consisting essentially of: a vinylidene fluoride/hexafluoropropylene/tetrafluoroethylene terpolymer fluoroelastomer; and 20 to 95% by weight of a thermoplastic fluoroelastomer comprising vinylidene fluoride/hexafluoropropylene/tetrafluoroethylene polymer, segments and polyvinylidene fluoride polymer segments.

12. The composition of claim 11, which contains a filler.

13. The composition of claim 11, which contains an additive selected from the group consisting of carbon black, silica and talc.

14. The composition of claim 11, which contains carbon black.

15. The composition of claim 11, which contains a cross-linking agent.

16. A fluoroelastomer composition, comprising: a fluoroelastomer selected from the group consisting of vinylidene fluoride/hexafluoropropylene copolymers, vinylidene fluoride/tetrafluoroethylene/hexafluoropropylene terpolymers, vinylidene fluoride/chlorotrifluoroethylene copolymers, tetrafluoroethylene/propylene copolymers, hexafluoropropylene/ethylene copolymers, perfluoroalkyl vinyl ether/olefin copolymers, fluorosilicone elastomers and fluorophosphazene elastomers; and 20 to 95% by weight of a thermoplastic fluoroelastomer comprising a polymeric chain having two or three polymer segments, at least one iodine atom liberated from an iodinated compound bonded at a terminal position of said polymeric chain and a fragment of the iodinated compound from which at least one iodine atom has been removed bonded at another terminal position of said polymeric chain, said iodinated compound being a perhalohydrocarbon of 1 to 16 carbon atoms wherein at least one of the halogen atoms is an iodine atom but only one iodine atom is present on every two adjacent carbon atoms and the other halogen atoms consist of (1) fluorine atoms or (2) fluorine atoms and chlorine atoms but the number of chlorine atoms is not more than that of fluorine atoms and only one chlorine atom is present on one carbon atom, and which may have an oxygen linkage (—O—) between any two carbon atoms and/or include additionally —CF$_2$H or =CF$_2$, whereby said polymeric chain intervenes between said iodine atom and said fragment, wherein adjacent polymer segments are different in steric configuration or monomeric composition, one polymer segment (when the polymer chain comprises two polymer segments) or one or two polymer segments (when the polymeric chain comprises three polymer segments) being an elastomeric polymer segment(s) having a molecular weight of from 30,000 to 1,200,000 selected from the group consisting of (1) a vinylidene fluoride/hexafluoropropylene or pentafluoropropylene/tetrafluoroethylene polymer in a molar ratio of 45–90:5–50:0–35 and (2) a perfluoro(C$_1$-C$_3$-alkyl vinyl ether) (including those having plural ether linkages)/tetrafluoroethylene/vinylidene fluoride polymer in a molar ratio of 15–75:0–85:0–85, the other polymer segment(s) being a non-elastomeric polymer segment having a molecular weight of from 3,000 to 400,000 selected from the group consisting of (3) a vinylidene fluoride/tetrafluoroethylene polymer in a molar ratio of 0:100 to 100:0 and (4) an ethylene/tetrafluoroethylene/hexafluoropropylene, 3,3,3-trifluoropropylene-1, 2-trifluoromethyl-3,3,3-trifluoropropylene-1 or perfluoro(C$_1$-C$_3$-alkyl vinyl ether) (including those having plural ether linkages) polymer in a molar ratio of 40–60:60–40:0–30, wherein the weight ratio of the elastomeric polymer segment to the non-elastomeric polymer segment is from 40:60 to 95:5.

17. The composition of claim 16, which contains 30 to 90% of the thermoplastic fluoroelastomer.

18. The composition of claim 16, which contains a cross-linking agent.

19. The composition of claim 16, which contains a filler.

* * * * *